US009794630B2

(12) United States Patent
Sanchez-Leighton

(10) Patent No.: US 9,794,630 B2
(45) Date of Patent: Oct. 17, 2017

(54) DEVICE FOR PROCESSING MULTIMEDIA CONTENTS IMPLEMENTING A PLURALITY OF VIRTUAL MACHINES

(71) Applicant: VIACCESS, Paris la Defense (FR)

(72) Inventor: Vicente Sanchez-Leighton, Rennes (FR)

(73) Assignee: VIACCESS, La Defense (FR)

( * ) Notice: Subject to any disclaimer, the term of this patent is extended or adjusted under 35 U.S.C. 154(b) by 132 days.

(21) Appl. No.: 14/439,011

(22) PCT Filed: Oct. 10, 2013

(86) PCT No.: PCT/EP2013/071194
§ 371 (c)(1),
(2) Date: Apr. 28, 2015

(87) PCT Pub. No.: WO2014/067760
PCT Pub. Date: May 8, 2014

(65) Prior Publication Data

US 2015/0304716 A1 Oct. 22, 2015

(30) Foreign Application Priority Data

Nov. 5, 2012 (FR) ..................................... 12 60478

(51) Int. Cl.
*H04N 21/443* (2011.01)
*H04N 21/4627* (2011.01)
(Continued)

(52) U.S. Cl.
CPC ..... *H04N 21/4623* (2013.01); *G06F 9/45558* (2013.01); *G06F 21/53* (2013.01);
(Continued)

(58) Field of Classification Search
CPC ........... H04N 21/4437; H04N 21/4623; H04N 21/4627; H04N 21/8173; G06F 9/45558; G06F 9/45533; G06F 21/53
See application file for complete search history.

(56) References Cited

U.S. PATENT DOCUMENTS

2006/0136720 A1 6/2006 Armstrong et al.
2007/0300219 A1 12/2007 Devaux
(Continued)

FOREIGN PATENT DOCUMENTS

EP 2 400 739 A1 12/2011
EP 2 515 231 A1 10/2012
(Continued)

OTHER PUBLICATIONS

Search Report for corresponding International Application PCT/EP2013/071194.
(Continued)

*Primary Examiner* — Benjamin R Bruckart
*Assistant Examiner* — Jason Thomas
(74) *Attorney, Agent, or Firm* — Davidson, Davidson & Kappel, LLC

(57) ABSTRACT

A multimedia content processing device for processing multimedia contents implementing a plurality of virtual machines is provided. The device is able to receive encrypted multimedia content, protected by a content protection system, and provide the multimedia content in decrypted form to a user device, including an access controller authorizing the provision of the decrypted multimedia content to the user device, a first securer for executing security services having a first associated level of security and a second securer for executing services having an associated level of security lower than the first level of security. The device includes a hypervisor able to control the
(Continued)

VM 0
VM n
68
APPS
APPS
72
66
OS
OS
70
60
VM Entry
VM Exit
VMCS Configuration
56
62
30
H/W VM Control Structure (VMCS)
Memory and I/O Virtualisation
54
58
VT-x CPU0
CPUn
50
52 execution of at least three groups of virtual machines, the groups of virtual machines being executed in a strictly separate manner, including, the first two groups being dedicated to executing services with a level of security lower than the first level of security and the third group of virtual machines able to implement security services with a first level of security and to act as trusted third parties for services of the first and second groups of virtual machines.

9 Claims, 2 Drawing Sheets

(51) Int. Cl.

| | |
|---|---|
| ***H04N 21/81*** | (2011.01) |
| ***G06F 21/53*** | (2013.01) |
| ***G06F 9/455*** | (2006.01) |
| ***H04N 21/4623*** | (2011.01) |
| ***G06F 21/78*** | (2013.01) |

(52) U.S. Cl.

CPC ......... *G06F 21/78* (2013.01); *H04N 21/4437* (2013.01); *H04N 21/4627* (2013.01); *H04N 21/8173* (2013.01); *G06F 9/45533* (2013.01); *G06F 2009/45587* (2013.01); *G06F 2221/034* (2013.01)

(56) References Cited

U.S. PATENT DOCUMENTS

2010/0263059 A1* 10/2010 Curtis .............. H04N 21/43607 726/29
2011/0246785 A1 10/2011 Linsley et al.
2011/0317831 A1* 12/2011 Passera .............. H04N 21/4437 380/201
2012/0167089 A1 6/2012 Vermande et al.
2014/0075494 A1* 3/2014 Fadida ................ G06F 9/45558 726/1

FOREIGN PATENT DOCUMENTS

WO WO 2006/027488 A1 3/2006
WO WO 2006/027488 A1 3/2006

OTHER PUBLICATIONS

Albert Chiang; “Securing the Future” (Nov. 30, 2006), XP055063981.
“Functional Model of a Conditional Access System.” EBU Review, Technical European Broadcasting Union, Brussels, Belgium, No. 266 (Dec. 21, 1995).

* cited by examiner

DEVICE FOR PROCESSING MULTIMEDIA CONTENTS IMPLEMENTING A PLURALITY OF VIRTUAL MACHINES

The present invention relates to a device for processing multimedia content, able to receive encrypted multimedia contents, protected by a content protection system, and provide that multimedia content in decrypted form to a user device.

More generally, the invention falls within the field of the protected distribution of multimedia content provided by a content provider, and processing and viewing devices for such content, for example smart TV devices.

BACKGROUND

Such smart TV devices traditionally comprise visual and audio retrieval means for multimedia content, typically a television set, and a decoder, either integrated into the retrieval means, or in the form of a separate unit connected to the retrieval means. Such a decoder comprises means for receiving protected multimedia content, for example encrypted using a control word, means for implementing access control, and means for decrypting the received multimedia content if the access conditions are validated, decoding and retrieval means for the received multimedia content.

Furthermore, recent smart TV devices also have means for connecting to the Internet and allow the user to download and access third-party application services (for example games, banking services), which come from third-party servers completely independent of the multimedia content provider or the operator, who is for example a telecommunications service provider, smart TV device provider, which is an intermediary between the content provider and the user.

SUMMARY OF THE INVENTION

Currently, from a software architecture perspective, all of the application services and services relative to multimedia content are structured over a single operating system. Such a software architecture potentially causes security problems for the multimedia content and data relative to the third-party application services. In fact, integrating a large number of services from heterogeneous sources into a same software stack increases the likelihood of errors and software weaknesses, which are the basis for attacks and piracy. In particular, it is known that the larger a software program is, the higher the likelihood of errors is.

Yet in the field of distributing protected multimedia content, it is crucial to preserve the rights of content providers, to avoid the recovery of decrypted content and the retrieval thereof for distribution outside those rights. The services relative to multimedia content, and multimedia content itself, must therefore be protected.

Furthermore, certain data relative to the third-party application services must also be protected, whether it for example involves banking data or confidential data in other fields, that the user does not wish to distribute without giving authorization.

Thus, smart TV devices make it possible both to access protected multimedia content and to access application services from various third-party servers having high security requirements, which are not met by devices with a software architecture using a single software stack.

An object of the invention is to resolve this security flaw of smart TV devices of the state of the art. A multimedia content processing device is provided, able to receive encrypted multimedia content, protected by a content protection system, and provide the multimedia content in decrypted form to a user device, comprising means for implementing access control authorizing the provision of said decrypted multimedia content to said user device, means for executing security services having a first associated level of security and means for executing services having an associated level of security lower than said first level of security.

The device comprises:

- a hypervisor able to control the execution of at least three groups of virtual machines, said groups of virtual machines being executed in a strictly separate manner, including:
- a first group of virtual machines dedicated to executing third-party application services with a level of security lower than the first level of security, installed by at least one user,
- a second group of virtual machines dedicated to the execution of services controlled by at least one operator, with a level of security lower than the first level of security, and
- a third group of virtual machines able to implement security services with a first level of security and to act as trusted third parties for services of said first and second groups of virtual machines.

Advantageously, the division into three groups of virtual machines controlled by a hypervisor, with one group of virtual machines designed to carry out all of the security services having a first level of security, makes it possible to provide much better security and robustness with respect to any attacks than the software architecture with a single software stack. In fact, the groups of virtual machines thus established are executed strictly separately, and over a particularly compact hypervisor, which clearly limits the risk of attacks by design.

Furthermore, advantageously, the group of virtual machines designed to carry out all of the security services performs a trusted third party role.

The multimedia content processing device according to the invention may have one or more of the features below:

- the third group comprises at least one virtual machine executing a multimedia decryption service;
- it further comprises data storage means relative to the implemented services;
- said third-party application services are applications whose provision is controlled by at least one application provider, said at least one provider being independent of said at least one operator;
- one said operator is a distributor of encrypted multimedia content and said user of the device is authorized to obtain decrypted multimedia content obtained from encrypted multimedia content provided by the operator under the oversight of a virtual machine from the third group able to provide a decoding service to an access control service for the multimedia content;
- it comprises means for accessing a communication network, and said third-party application services are downloaded by the user via said communication network;
- said third group comprises a virtual machine performing a trusted third party service, able to communicate with a service implemented by a virtual machine of the first group or with a service implemented by a virtual machine of the second group through secure channels;
- the virtual machines of said third group have execution privileges assigned by said hypervisor greater than the execution privileges respectively assigned to the virtual machines from said first group and second group;

each virtual machine of said first group executes a third-party application service or a third-party application service aggregate;

it comprises a predetermined number of physical processors, and said hypervisor is able to control said physical processors.

BRIEF DESCRIPTION OF THE DRAWINGS

Other features and advantages of the invention will emerge from the description thereof provided below, for information and non-limitingly, in reference to the appended figures, in which.

DETAILED DESCRIPTION

Figure 1:
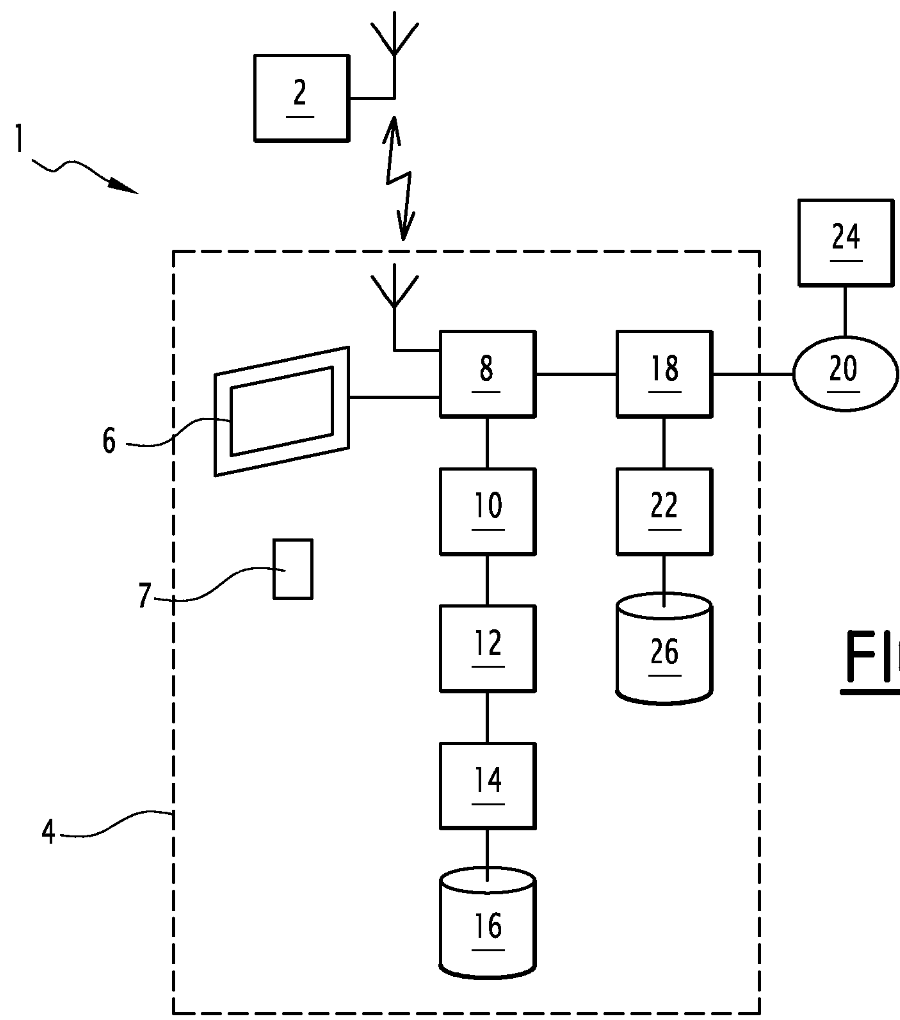
FIG. 1 shows a system for providing encrypted multimedia content comprising a multimedia content processing device according to an embodiment of the invention.

The system 1 for providing encrypted multimedia content of FIG. 1 comprises a transmitter 2, for example managed by a content provider or by one or more operator(s), which is suitable for distributing multimedia content encrypted using a control word to a set of receivers. For simplification, only one such receiver 4 is illustrated in FIG. 1.

In the embodiment illustrated in FIG. 1, the transmitter 2 is provided with a transmission antenna. In addition to the encrypted multimedia content, the transmitter sends entitlement control messages (ECM) comprising a control word suitable for decrypting the encrypted multimedia content and entitlement management messages (EMM).

The receiver 4 is typically a multimedia content processing device according to the invention, for example a smart TV device.

The multimedia content processing device 4 comprises means for retrieving the multimedia content 6, typically a screen combined with audio retrieval means, traditional control means 7, for example a remote control, allowing a user to control various functionalities offered by the device 4, on the one hand functionalities related to the multimedia content (for example play, source change, pause, rewind), and on the other hand functionalities related to the installation and use of other third-party application services. The device 4 also comprises a decoder 8 provided with a reception antenna, able to receive encrypted multimedia content, to decode it after decryption, and to subsequently provide it to the retrieval means 6, which, with the control means 7, form a user device in this example embodiment.

The multimedia content processing device 4 also comprises means 10 for inspecting entitlement messages for the encrypted content, in a known manner implementing the received ECM and EMM messages and their processing as a function of a subscription by the user of the device 4. In one embodiment, the control means 10 implement a conditional access system as described in "*Functional Model of a Conditional Access System*", EBU Review, Technical European Broadcasting Union, Brussels, BE, No. 266, Dec. 21, 1995.

This device 4 also comprises decryption means 12 for decrypting the received multimedia content and decoding means 14 for the encrypted control words received via the control messages for the entitlement control messages ECM.

The decryption means 12 and decoding means 14 are able to perform security services, having a first level of security, which is the highest considered security level. In particular, this means that it is important to perform the security services implemented by these means that are very difficult to pirate through any type of attack.

Various parameters necessary to perform security services are stored in an associated memory 16.

The decoding 14 and decryption 12 means are implemented to provide decrypted multimedia content from received multimedia content, that decrypted multimedia content subsequently being provided to the decoder 8 able to decode it in real time to provide decoded multimedia content, able to be retrieved on the retrieval means 6.

The multimedia processing device 4 furthermore comprises means 18 for connecting to a communication network 20, which is for example the Internet.

Furthermore, means 22 for performing application services are also present, those application services having an associated level of security lower than the first level of security, therefore requiring less security.

For example, third-party application services with a level of security lower than the first level of security are typically software applications provided by third-party servers, and downloaded and installed by a user of the multimedia content processing device 4. A third-party server 24 is typically completely independent of the provider or operator responsible for the transmitter 2.

For example, a third-party application service may be a banking application allowing the user to view banking data. Another third-party application service is for example a game application compatible with the retrieval means 6 and the available control means 7.

Storage means 26 for storing parameters and data relative to the third-party application services are also present.

Figure 2:
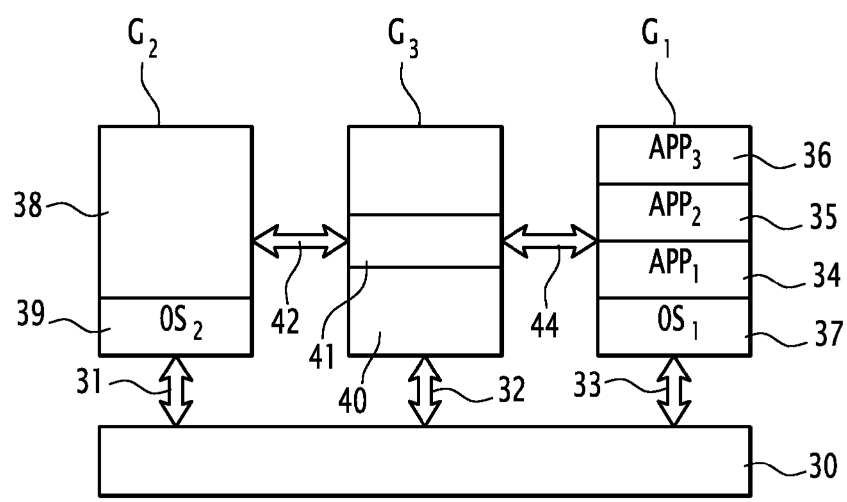
FIG. 2 diagrammatically illustrates an embodiment of the proposed software architecture, and FIG. 3 diagrammatically shows a hypervisor in one embodiment of the invention.

In one alternative embodiment, the processing device 4 implementing the invention is implemented in the form of a connection housing of the set-top box type, able to send decrypted multimedia content to a user device having retrieval means for the multimedia content, such as a television set. FIG. 2 illustrates the software architecture making it possible to implement the various implemented means described in reference to FIG. 1 according to one embodiment of the invention.

In this embodiment, the set of services performed by the multimedia content processing device 4 is divided among three groups of virtual machines, respectively denoted G1, G2 and G3, which are controlled by a hypervisor or VMM (Virtual Machine Monitor), denoted 30 in FIG. 2.

A hypervisor is a known software mechanism making it possible to create, on a hardware support made up of one or more processors, any number of isolated and independent virtual processors, and also to partition the memory (RAM, SRAM, etc.). A hypervisor will be described in more detail below in reference to FIG. 3.

The hypervisor 30 controls the groups of virtual machines G1, G2 and G3 via instructions 31, 32, 33 assigning execution privileges to each virtual machine and each group of virtual machines. The different virtual machines are executed strictly separately, even if they belong to a same group.

The first group of virtual machines G1 implements the execution means 22 for third-party application services, coming from third-party services that are controlled by application providers independent of the operator(s) providing multimedia content. The third-party servers are accessible via the communication network 20, and the third-party application services are downloaded and installed by the user.

Each virtual machine of this first group executes a software stack corresponding to a given set of third-party application services, respectively denoted $APP_1$, $APP_2$ and $APP_3$ in the figure. In the example illustrated in FIG. 2, only one virtual machine is shown in group G1; its software stack is made up of several third-party applications: 34 associated with service $APP_1$, 35 with service $APP_2$, and 36 with service $APP_3$.

Alternatively, for performance reasons it is considered to aggregate similar application services, having very close and interwoven functionalities, in a single software stack, executed by a virtual machine. In that case, a virtual machine of the first group executes a third-party application service aggregate.

Furthermore, one embodiment of the virtual processor of the specific group of virtual machines G1 37, having a high execution privilege level, is dedicated to implementing an operating system OS1, for example the Linux assembly completed by the set of libraries necessary to execute $APP_1$, $APP_2$, $APP_3$, commonly called runtime.

The second group of virtual machines G2 is dedicated to applications or application services 38 controlled by the operator or one of the operators that are responsible for the encrypted multimedia content transmitter 2, but which have an associated level of security lower than the first level of security. The services provided by the operator are supported by an operating system OS2, implemented by a privileged mode 39 of the virtual processor.

The operating system OS2 may be different from the operating system OS1, thereby making it possible to have heterogeneous operating environments coexist.

It may be considered that the level of security of the services provided by the operator(s) is different from the level of security associated with the third-party application services installed by the user, but it is nevertheless lower than the level of security both of group G3 for managing the security, and the maximal level of the hypervisor.

For example, the services provided by the operators include pay-per-view multimedia content offers, content replay offers, content recommendations, free content, etc.

In one embodiment, the service is provided by an operator or installed in advance on the multimedia content processing device 4, when that device is provided to the user. An update of the services provided by the operator may also be considered. In that case, it is provided to authenticate the operator, via an authentication protocol, by the hypervisor 30, such that an application service transmitted by the operator is installed by the hypervisor 30 for execution by a virtual machine of the second group of virtual machines G2.

All of the services provided by the operator and requiring a high level of security equal to the first level of security, called security services, in particular the services performed by the access control 10, decryption 12 and decoding 14 means, are each executed by a virtual machine from the third group of virtual machines G3 or by a process of one of its virtual machines. In particular, a virtual machine from group G3 provides a decoding service to an access control service, making it possible to verify the user's access rights to the multimedia content.

The group of virtual machines to G3, or security group, also executes other services with the first level of security, for example such as secure display, secure storage, secure network access, password and/or login entry, etc.

A virtual machine from this group of virtual machines G3 implements a surveillance 40 or security monitoring service, which makes it possible to verify the compliance of the execution of the services respectively implemented by the other groups of virtual machines and to stop/reboot the virtual machines in question if necessary. When the behavior of one of the virtual machines from groups G1 and G2 deviates, or appears to deviate, from the security prerequisites declared by each of those groups, the security monitoring system 40 may, if the execution contract for one of the groups G1 or G2 requires it, decide to stop and restart one or all of the virtual machines in the group, if their behavior departs from the predefined framework, like anti-malware or antivirus software.

The group of virtual machines G3 also performs a 'trusted third party' service 41, guaranteeing equitable sharing of the available hardware resources: memory 16, 26, network connections 18, execution time and use of the physical processors present, in particular specialized processors of the GPU type.

The virtual machines from other groups of virtual machines will be connected to this trusted third party service 41 via secure channels 42, 44, allowing them to dialogue with the trusted third party service 41 using a specific protocol. A secure communication channel is a channel whose use cannot directly endanger the operation of the virtual machines using it. Even if one of the virtual machines using the secure channel is compromised, subject to attacks, using this channel may not directly cause a deterioration of the security of the other virtual machine using the channel. Such secure channels are known by one skilled in the art: they are primarily built on resources (processor, memory, bus) statically allocated in a strictly limited manner. Of course, no secure channel may stop attacks by indirect channels and deductions, but they may slow the spread of the threat and provide time for a response by the security group G3.

Thus, the trusted third party service 41 guarantees, according to pre-established specifications, the security contract of each group of machines, protection and integrity of some data from groups G1 and G2, and relative impermeability to attacks or defects.

Figure 3:
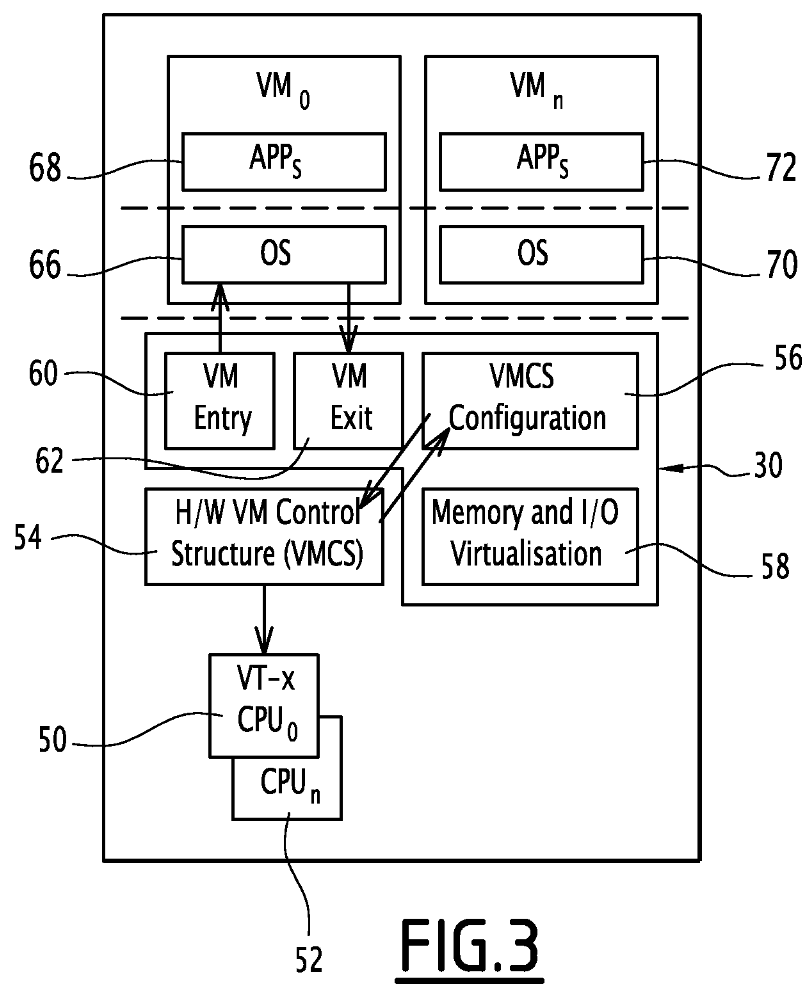

FIG. 3 diagrammatically shows an implementation in the context of the Intel® processor architecture of a hypervisor 30 controlling two virtual machines respectively denoted $VM_0$ and $VM_n$.

The hypervisor 30 is developed in the form of a software program, on a hardware medium offered by a given number n of suitable physical processors. Two such processors denoted 50, 52 are illustrated in the figure. The set of physical processors comprises a virtual memory management unit (MMU).

The hypervisor 30 runs at startup and controls all of the hardware resources in order to replace the operation of the n native physical processors with that of a set of virtual processors or virtual machines.

Traditionally, the processor virtualization comprises modifying source codes of the operating systems of the physical processors such that the privileged instructions are replaced by equivalent services provided by the hypervisor. The other instructions are executed directly by the real processors. As part of the Intel® architecture shown in FIG. 3, this modification of the sources is not necessary, because the processors of this architecture having the VT-x technology physically simulate the complete context of the virtual processor with total compatibility.

This functionality is performed by a module 54 that monitors the physical processors, in collaboration with control and configuration software 56.

The hypervisor 30 also comprises a virtualization module 58 for the memory, memory addressing spaces and inputs-outputs.

The hypervisor runs in the most privileged mode of the physical processors, the virtualized operating systems in a less privileged mode than that of the hypervisor, and the applications and services managed by the virtualized operating systems in an even less privileged mode if one is available, or otherwise in the same mode as the virtualized operating system, as illustrated by the steps in FIG. 3.

In that case, two modules respectively denoted 60 and 62 perform sequencing of the implemented virtual machines.

Several implementations of a hypervisor making it possible to create several virtual machines and manage the separation of the memory spaces are known in the state of the art. Reference may for example be made to document WO2006027488, which describes an advantageous embodiment of a hypervisor program.

Document WO2006027488 is also published as U.S. Publication No. 2007/0300219, which is hereby incorporated by reference herein, and in particular describes the management by the hypervisor of the execution privileges of the virtual machines.

Preferably, and in order to obtain the expected security results, the binary code comprising the instructions allowing implementation of the hypervisor program is very compact, for example approximately several tens of kilobytes, so as to statistically limit the quantity of errors or bugs.

Preferably, and for the same security reasons, the execution of the hypervisor is atomic, therefore cannot be interrupted, and any call for the hypervisor is therefore limited to several hundred binary instructions, so as not to bother the fluidity of the assembly.

In each virtual machine, a respective operating system is supervised by the control modules of the hypervisor, the operating system controlling the execution of the applications, which have lower privilege levels in non-virtualized mode.

For example, in the illustration of FIG. 3, the hypervisor supervises the module 66 of the virtual machine $VM_0$ implemented in operating system OS having a higher privilege level than the privilege level of the applications APPs implemented in the module referenced 68, over the operating system OS. The same is true for the operating system 70 implemented by the virtual machine $VM_n$, which has a privilege level higher than the privilege level of the applications APPS of the module 72.

According to one particular embodiment, the hypervisor is able to provide a particular privilege level to one of the virtual machines, therefore to allow one of the virtual machines to have extensive rights relative to the other virtual machines.

This functionality is advantageously used to implement virtual machines in the third group of virtual security machines denoted G3 in FIG. 2, thereby in particular allowing the implementation of the security monitoring services 40 and trusted third party services 41, the group G3 thus being able to arbitrate and control the implementation of application services performed by one or the other of the other virtual machines.

Preferably, the security services of the group of virtual security machines are static and preinstalled in order to increase the security and robustness with respect to any attacks. These security services can nevertheless be restarted or rebooted.

The communication between the various virtual machines is done by secure communication channels, as already described above.

The invention has been described above in an embodiment in which the multimedia content is protected by an access control system based on control messages and entitlement management messages. Alternatively, the multimedia content is protected by a digital rights management (DRM) system, in which the rights associated with the multimedia content are managed through licenses.

Advantageously, in addition to the partitioning specific to each virtual machine, and each group of communicating virtual machines with the same level of security, the group of virtual machines designed to carry out the security services also performs active partitioning: by providing strict, balanced and preventive management, the software libraries and peripherals shared between the other groups of virtual machines (the operator group, the third-party application group). The group of trusted third-party virtual machines respects the security needs of both the operator services and the third-party applications.

What is claimed is:

1. A multimedia content processing device, configured to receive encrypted multimedia content from a transmitter managed by an operator, protected by a content protection system, and provide the multimedia content in decrypted form to a user device, comprising:

at least one processor; and at least one non-transitory memory comprising instructions executable by the processor to control the multimedia content processing device to:

implement access control authorizing a provision of the decrypted multimedia content to the user device;

execute security services having a first level of security and execute services having an associated level of security lower than the first level of security, comprising:

execute a hypervisor to control an execution of at least three groups of virtual machines, the groups of virtual machines being executed in a strictly separate manner, including:

a first group of virtual machines dedicated to executing third-party application services with a level of security lower than the first level of security, installed by at least one user, a second group of virtual machines dedicated to executing services controlled by at least one operator, with a level of security lower than the first level of security, and a third group of virtual machines able to implement security services with a first level of security and to implement a trusted third party service adapted to supervise sharing of available hardware resources of the first and second groups of virtual machines, the memory being relative to the third-party application services executed by the first group of virtual machines, the services controlled by at least one operator executed by the second group of virtual machines and the security services implemented by the third group of virtual machines.

2. The multimedia content processing device as recited in claim 1 wherein the third group comprises at least one virtual machine executing a multimedia decryption service.

3. The multimedia content processing device as recited in claim 1 wherein the third-party application services are applications whose provision is controlled by at least one application provider, the at least one provider being independent of the at least one operator.

4. The multimedia content processing device as recited in claim 1 wherein the at least one operator is a distributor of encrypted multimedia content and the user of the device is authorized to obtain decrypted multimedia content obtained from encrypted multimedia content provided by the distributor of encrypted multimedia content under the control of a virtual machine from the third group able to provide a decoding service to an access control service for the multimedia content.

5. The multimedia content processing device as recited in claim 1 further comprising a connector for accessing a communication network, the third-party application services being downloaded by the user via the communication network.

6. The multimedia content processing device as recited in claim 1 wherein the third group comprises a virtual machine performing a trusted third party service, able to communicate with a service implemented by a virtual machine of the first group or with a service implemented by a virtual machine of the second group through secure channels.

7. The multimedia content processing device as recited in claim 1 wherein the virtual machines of the third group have execution privileges assigned by the hypervisor greater than the execution privileges respectively assigned to the virtual machines from the first group and second group.

8. The multimedia content processing device as recited in claim 1 wherein each virtual machine of the first group executes a third-party application service or a third-party application service aggregate.

9. The multimedia content processing device as recited in claim 1 wherein the at least one processor includes a predetermined number of physical processors, and the hypervisor is able to control the physical processors.

* * * * *